United States Patent [19]

Ichinokawa

[11] Patent Number: 5,467,142
[45] Date of Patent: Nov. 14, 1995

[54] TELEVISION RECEIVER FOR REPRODUCING VIDEO IMAGES HAVING DIFFERENT ASPECT RATIOS AND CHARACTERS TRANSMITTED WITH VIDEO IMAGES

[75] Inventor: Hiroaki Ichinokawa, Ibaraki, Japan

[73] Assignee: Victor Company of Japan, Ltd., Yokohama, Japan

[21] Appl. No.: 51,406

[22] Filed: Apr. 23, 1993

[30] Foreign Application Priority Data

Apr. 24, 1992 [JP] Japan ................................ 4-131715

[51] Int. Cl.$^6$ ........................... H04N 7/08; H04N 5/445
[52] U.S. Cl. .................... 348/556; 348/564; 348/468
[58] Field of Search ........................ 358/183, 160, 358/22; 348/553, 556, 557, 563, 564, 569, 570, 461, 468; 345/115, 127, 143; H04N 5/445, 5/46, 5/50, 7/08, 7/087

[56] References Cited

U.S. PATENT DOCUMENTS

| 4,899,139 | 2/1990 | Ishimochi et al. .............. 345/115 X |
| 4,962,428 | 10/1990 | Tong et al. ..................... 358/183 X |

FOREIGN PATENT DOCUMENTS

| 0021378 | 1/1987 | Japan ................ H04N 5/445 |
| 0054885 | 3/1988 | Japan ................ H04N 5/445 |
| 0051778 | 3/1988 | Japan ................ H04N 5/445 |
| 0141474 | 6/1989 | Japan ................ H04N 5/445 |
| 0019088 | 1/1990 | Japan ................ H04N 7/000 |

*Primary Examiner*—David E. Harvey
*Attorney, Agent, or Firm*—Lowe, Price, LeBlanc & Becker

[57] ABSTRACT

A television receiver for displaying a video signal representing a first frame with a first aspect ratio is described wherein the video signal includes a coded character signal to be reproduced within the first frame. The receiver includes: a decoding unit for decoding the coded character signal; a first converter for converting the video signal into a second video signal to be reproduced to have a second frame with a second aspect ratio in accordance with a mode signal; a second converter for converting the decoded character signal into a second character signal to be reproduced to have a third frame smaller than the second frame; and a displaying unit for displaying the second video signal and the second character signal with characters from the second character signal being superimposed on a video image reproduced from the second video signal. The second converter controls start position and size of displayed characters by controlling counters used for determining the start position and size. Alternatively, a frequency of a clock signal used for determining the start position and size may be controlled.

20 Claims, 11 Drawing Sheets

REGULAR MODE

CINEMA MODE

FULL MODE

TELEVISION RECEIVER FOR REPRODUCING VIDEO IMAGES HAVING DIFFERENT ASPECT RATIOS AND CHARACTERS TRANSMITTED WITH VIDEO IMAGES

BACKGROUND OF THE INVENTION

1. Field of the Invention

This invention relates to a television receiver for reproducing video images having different aspect ratios and characters transmitted with the video images.

2. Description of the Prior Art

A first prior art television receivers having an oblong CRT (cathode ray tube) with an aspect ratio 16:9 is known. Such a prior art television receiver is originally provided for reproducing a video signal of the HDTV (high definition television) or the like. A second prior art television receiver with the oblong CRT capable of reproducing a video image having a different aspect ratio, namely, 4:3 in addition to the video image of 16:9 by using a compression or extension technique is known. In such a prior art television receiver, the user can reproduce video images having different aspect ratios by selecting a display mode from the standard mode for reproducing video image transmitted in the HDTV broadcasting and various modes for reproducing the video images having the aspect ratio of 4:3.

FIG. 5A is an illustration for showing a displaying condition in a prior art standard type television with a CRT having an aspect ratio of 4:3. FIGS. 5B to 5D are illustrations for showing displaying conditions in a plurality of displaying modes in the prior art television with an oblong CRT and are used in the description of the invention. In FIG. 5A, a circle is displayed on the standard type CRT having the aspect ratio of 4:3. If this video signal is displayed on the television receiver having the oblong CRT with the aspect ratio of 16:9 without a compression processing, the circle is displayed in an oval as shown in FIG. 5D (hereinafter, this mode is referred to as a full mode). Then, a compression processing for compressing the video signal in the horizontal direction is carried out to make the oval close to the circle. FIG. 5B shows this condition (hereinafter this mode is referred to as a regular mode). In this mode, though there are non-displayed areas, (i.e., black areas) at both sides of the CRT, the circle is correctly reproduced. FIG. 5C shows a condition that the video signal is displayed with the aspect ratio of the displayed image unchanged by over-scanning of the deflection circuit(hereinafter this mode is referred to as a cinema mode). That is, the video image is enlarged in the vertical direction compared with the full mode as shown in FIG. 5D. The user cannot watch the areas within the chain lines in FIG. 5C. However, this cinema mode provides the most strong appeal to the user. Therefore, this cinema mode is suitable for reproducing a cinema. In this mode about 80% of the original video image is reproduced. In other words, about 380 horizontal scanning lines are reproduced though the original video image includes about 480 horizontal scanning lines.

A third prior art television receiver having a function for reproducing character information with the video image superimposed on the oblong CRT in addition to the display modes of regular, cinema, and full modes mentioned above, is known. The character information is multiplexed on the video signal at horizontal blanking periods of 21st and 284th horizontal scanning lines in a form of the NRZ system, each piece of character information at each horizontal blanking period include 16 bit data. This prior art television receiver detects the character information, (i.e., caption information), at every horizontal blanking period multiplexed just after the vertical blanking period and displays the caption information on the CRT.

FIG. 6A is an illustration for showing a relation between the size of a prior art CRT having the aspect ratio of 4:3 and a region for displaying the caption information, namely, a character display region which is represented by the hatched portion. This drawing is also used in the description of the invention. In FIG. 6A, A denotes a height of the CRT; B denotes a width of the CRT; C denotes a height of the character display region which is equal to A×0.80; D denotes a width of the character display region which is equal to a×1.07; E denotes a vertical end position which is equal to A×0.10; and F denotes a horizontal end position which is equal to A×0.13.

FIG. 6B is an illustration for showing a map of displayed characters within the character display region. This drawing is also used in the description of the invention. The character display region includes 34 rows and 15 columns wherein the first and 34th columns are not used for displaying.

In the prior art television receiver, the caption information transmitted with the video signal is separated from the video signal by a caption information processing unit which decodes the separated caption information and superimposes characters on the video image in accordance with the decoded caption information. The conversion of the video image, (i.e., display size conversion), as shown in FIGS. 5B to 5D are carried out before superimposing the characters. This is because there is a tendency that a picture quality of the characters decreases due to conversion of the display mode, (i.e., changing of size of the display area). Particularly, conversion through a digital processing shows this tendency strongly. Moreover, there is a problem that the size of the characters will be too large or too small if the characters are superimposed before the display size conversion. However, in the television receiver with the oblong CRT, if the display conversion is carried out before the superimposing of the characters, there is a problem that the characters displayed in accordance with the caption information overflow the CRT or a suitable display region for displaying the characters. For example, if the characters are displayed in the cinema mode, upper and lower portions of characters slightly overflow the CRT having the aspect ratio of 16:9 in consideration of dispersion in displaying area of the CRT. In the regular mode, all characters can be displayed on the oblong CRT. However, right and left side portions of characters overflows the display area of the video signal because the video signal is compressed but the characters are not compressed in the horizontal direction. This provides unnatural feeling to the user.

Though FIG. 7 is a general block diagram of this invention, it is also applicable to a prior art television receiver with a caption information displaying function except that a size mode signal 31 is not supplied to a caption information processing circuit 8, and it is used for explanation of the prior art. FIG. 8 is a block diagram of a prior art caption information decoder shown in FIG. 7.

This prior art television has an oblong CRT 7 with an aspect ration of 16:9 and a displaying size conversion circuit for converting a video signal for a CRT with an aspect ration of 4:3 into a regular mode displaying size as shown in FIG. 5B.

A transmitted composite video signal including caption information (character information) is received by an antenna 1. The received composite video signal is converted to have an intermediate frequency by the tuner 2. The composite video signal having the intermediate frequency is amplified by an intermediate frequency amplifier which further includes a video signal detection circuit for detecting the composite video signal. The detected composite video signal is supplied to a video signal processing circuit 4 and to the caption information processing circuit 8. The video signal processing circuit 4 effects the Y/C separation, color reproduction, and matrix processings. An output of the video signal processing circuit 4 is supplied to a well-known displaying size conversion circuit 5. The displaying size conversion circuit 5 effects a displaying size conversion in accordance with a size mode signal 31. When the size mode signal indicates non-conversion, that is, the received video signal is for an oblong CRT 7 having an aspect ratio of 16:9, the display size conversion circuit 5 outputs the video signal from the video signal processing circuit 4 without conversion. When the display mode signal indicates another mode, that is, the received video signal is for a standard CRT (not shown) having an aspect ratio of 4:3, the displaying size conversion circuit 5 converts the video signal to reproduce the video signal to be reproduced as a video signal displayed on the oblong CRT having the aspect ratio of 16:9 as shown in FIGS. 5B, 5C, and 5D. That is, the video image is displayed on the oblong CRT 7 in a regular mode where there are non-displayed areas at both sides of the CRT 7, in a cinema mode where there are omitted areas at top and bottom portions, or in a full mode where all picture image displayed but the aspect ratio is unnatural. This processing is carried out using a digital compression technique of the video signal in the time base. An output of the displaying size conversion circuit 5 is sent to the RGB drive circuit 6 included a display portion 7a.

The caption signal processing circuit 8 separates the caption information from the detected video signal and outputs character color data signals R, G, and B indicative of color of characters to be displayed and a switching signal Ys indicative of switching between the video signal form the display size conversion circuit 5 and the character color data signals which are produced in accordance with the caption information. The character color data signals R, G, and B and the switching signal Ys are sent to the RGB drive circuit 6 in accordance with a caption information on/off signal 32 and the size mode signal 31. When the caption information on/off signal 32 indicates the non-conversion, the RGB drive circuit 6 outputs RGB drive signals produced from the video signal from the displaying size conversion circuit 5 to the CRT 7 because the switching signal Ys remains indicative of outputting only video signal. When the caption information on/off signal 32 indicates ON of displaying, the RGB drive circuit 6 outputs RGB drive signals with the character color data signals R, G, and B superimposed in response to the switching signal Ys to the CRT 7. A synchronizing circuit 9 separates horizontal and vertical signals from an output signal of the video signal processing circuit 4 and sends the horizontal and vertical synchronizing signals to a horizontal and vertical scanning circuit 10. The horizontal and vertical scanning circuit 10 has oscillators for producing a horizontal scanning signal of 15.75 kHz and a vertical scanning signal of 60 Hz in response to the horizontal and vertical synchronizing signals from the synchronizing circuit 9 respectively. That is, the horizontal and vertical deflection circuit 10 supplies horizontal and vertical deflection drive signals to a deflection unit 7b of the CRT 7 and supplies flyback pulses of the horizontal and vertical synchronizing signals to the caption information processing circuit 8. The caption information processing circuit 8 determines timing for positioning the caption information, (i.e., characters and marks on the picture plane of the CRT 7) in response to the horizontal and vertical synchronizing signals from the horizontal and vertical deflection circuit 10.

As shown in FIG. 8, the caption information processing circuit 8 comprises a front end unit 11, a decoding unit 12', and a display control unit 13'. The front end unit 11 receives the composite video signal from the intermediate frequency amplifier 3 and extracts the caption signal multiplexed in the composite video signal at 21st and 284th lines to send the caption signal to the decoding unit 12'. The decoding unit 12' decodes the caption signal and supplies display data to the display control unit 13' when the display of the caption information is commanded by a caption information on/off signal 32. The display control unit 13' supplies R, G, and B character signals indicative of color of the characters superimposed in the reproduced video image to the RGB drive circuit 6 with color of characters and timing of these signal determined in accordance with the received caption information, the horizontal and vertical signals supplied from the horizontal and vertical deflection circuit 10, and an oscillation signal produced by an oscillation circuit 13b to the RGB drive circuit 6. The display control unit 13' also supplies a switching signal Ys indicative of timing of switching between the R, G, and B drive signals and the R, G, and B character signals to the RGB drive circuit 6 with timing of the switching signal Ys determined in accordance with the received caption information; the horizontal and vertical signals supplied from the horizontal and vertical deflection circuit 10; and the oscillation signal.

The character decoding circuit 12a decodes the caption information to obtain decoded information of characters to be superimposed on the reproduced video image. The decoded information of characters is sent to a V RAM (random access memory for storing video data) 13c. The position data decoding circuit 12b decodes the caption signal to obtain positional information of a character within a display region of character information and sends the positional information to a display control circuit 13a of the display control unit 13'.

The memory 12c in the decoding unit 12' stores vertical start position data, horizontal start position data, size data indicative of vertical and horizontal sizes of a section for displaying one character to produce the display region as shown in FIGS. 6A and 6B.

FIG. 6A is an illustration for showing a relation between the size of a CRT 7 and a region for displaying the caption information, namely, a character display region 35 which is represented by the hatched portion.

FIG. 11 is an illustration for showing the vertical and horizontal start position data and vertical and horizontal size data. The vertical start position data Vposi indicates a vertical distance between the top left corner of the CRT 7 and the character display region 35. The horizontal start position data Hposi indicates a horizontal distance between the top left corner of the CRT 7 and the character display region 35. The vertical size data Vsize indicates a vertical size of one section included in the character display region 35, each section indicative of an area on which one character is to be displayed. The horizontal size data Hsize indicates a horizontal size of one section. More specifically, the memory 12c stores values set to counters included in the display control circuit 13a. That is, the memory 12c stores a value "a" for Vposi; a value "b" for Hposi; a value "c" for Vsize; and a value "d" for Hsize.

The memory 12c supplies the vertical and horizontal start position data and vertical and horizontal size data to the display control circuit 13a.

The display control unit 13' supplies the timing signal for displaying the character font data from the character ROM 13d at the commanded position with a suitable size. That is, the display control circuit 13' produces the timing signal using the horizontal synchronizing signal Hsync to determine timing of the vertical displaying of the character and using the clock signal outputted from the oscillation circuit 13b to determine timing of displaying of the characters in the horizontal direction. The oscillation circuit 13b is controlled to output the clock signal 37 in response to the vertical synchronizing signal Vsync. As mentioned, the display control circuit 13a controls position of the character display region.

FIG. 9 shows a flow chart of an operation of the prior art decoding unit 12'. The decoding unit 12' includes a microprocessor (not shown) and executes a stored program as shown in flow chart shown in FIG. 9. Processing starts at step 101. In the following step 102, a flag indicative of displaying/non-displaying of the caption information (DSP.FLG) is reset. In the following step 103, the memory 12c sets data of Vposi=a, Hposi=b, Vsize=c, and Hsize=d to the vertical start position and size counters and the horizontal start position and size counters of the display control circuit 13a. Then, processing proceeds to step 104.

In step 104, a decision is made to as whether or not the caption information on/off signal 32 is present. In the absence of the caption information on/off signal 32, processing returns to step 104. In the presence of the caption information on/off signal, processing proceeds to step 105. In step 105, a decision is made as to whether or not the displaying/non-displaying flag of the caption information (DSP.FLG) has been set. If the displaying/non-displaying flag has been set to 0, the flag is set to 1 in step 106. In the following step 107, the displaying of the caption information is started. That is, the character decoding circuit 12' starts outputting the decoded caption information. If the displaying/non-displaying flag has been set to 1, the flag is set to 0 in step 108. In the following step 109, the displaying of the caption information is stopped. That is, the character decoding circuit 12' stops the outputting of the decoded caption information.

As mentioned, the prior art television receiver having the caption information processing unit, did not control the caption information processing unit in accordance with the display size conversion, so that there are problems that a portion of the character information cannot be displayed and the display position of character information deviates from the correct position.

SUMMARY OF THE INVENTION

The present invention has been developed in order to remove the above-described drawbacks inherent to the conventional television receiver for reproducing video images having different aspect ratios and characters transmitted with the video images.

According to the present invention there is provided a television receiver for reproducing video image from a video signal to be reproduced to have a first frame with a first aspect ratio, the video signal including a coded character signal to be reproduced within the first frame, comprising: a decoding unit for decoding the coded character signal; a first converting unit for converting the video signal into a second video signal to be reproduced to have a second frame with a second aspect ratio in accordance with a mode signal; a second converting unit for converting the decoded character signal into a second character signal to be reproduced to have a third frame smaller than the second frame; and a displaying unit for displaying the second video signal and the second character signal with characters displayed from the second character signal being superimposed on a video image reproduced from the second video signal. The second converting unit controls start position of said frame and size of displayed characters by changing data set to counters for determining the start position and size. Frequency of a clock for determining the start position and size may be changed.

BRIEF DESCRIPTION OF THE DRAWINGS

The object and features of the present invention will become more readily apparent from the following detailed description taken in conjunction with the accompanying drawings in which.

DETAILED DESCRIPTION OF THE INVENTION

Hereinbelow will be described an embodiment of this invention with reference to drawings.

Figure 1:
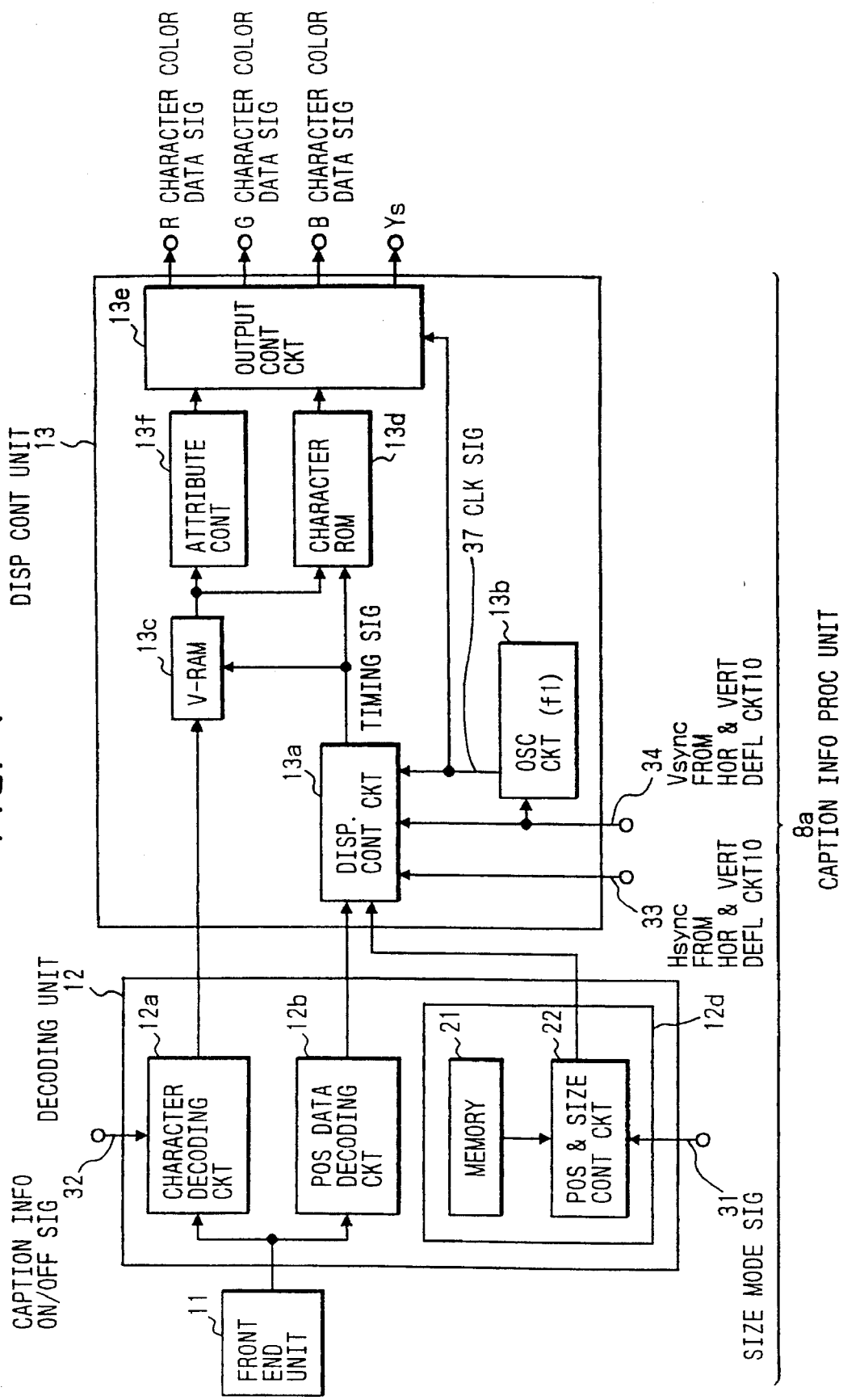
FIG. 1 is a block diagram of a first embodiment of this invention showing a caption information processing unit shown in FIG. 7.
Figure 7:
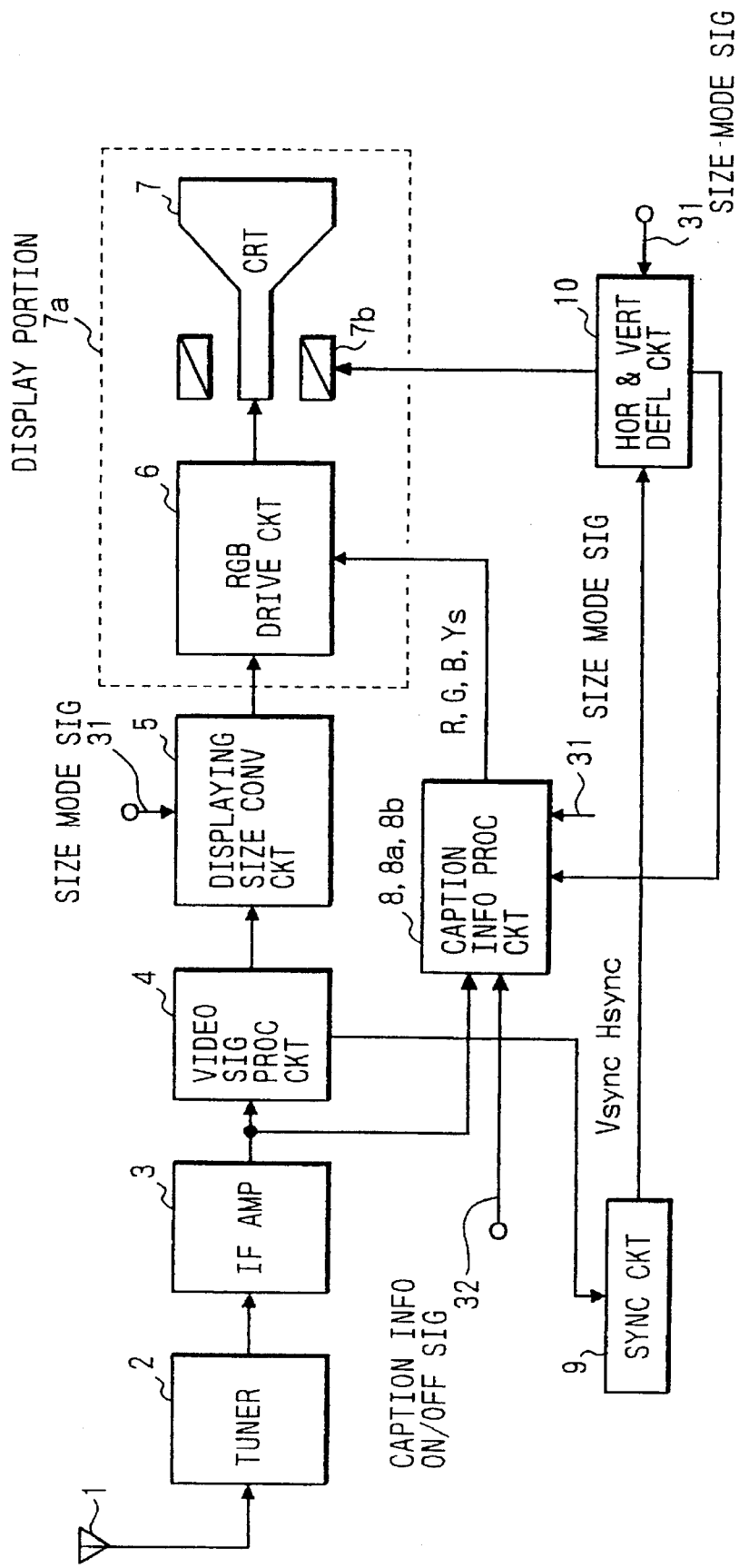
FIG. 7 is a general block diagram of the television receiver of the invention and is also used in the description of the prior art.
Figure 8:
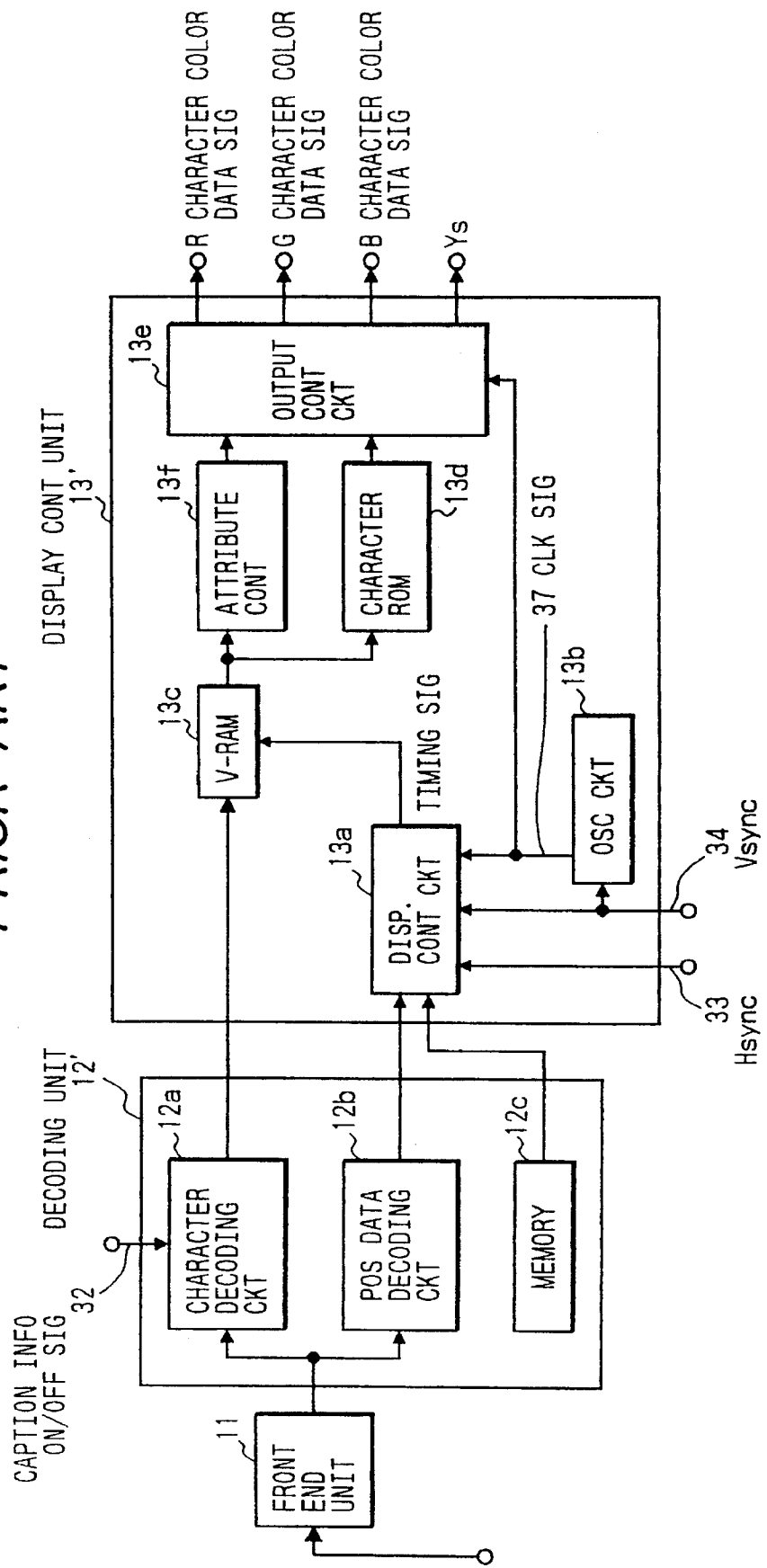
FIG. 8 is a block diagram of a prior art caption information decoder shown in FIG. 7
Figure 9:
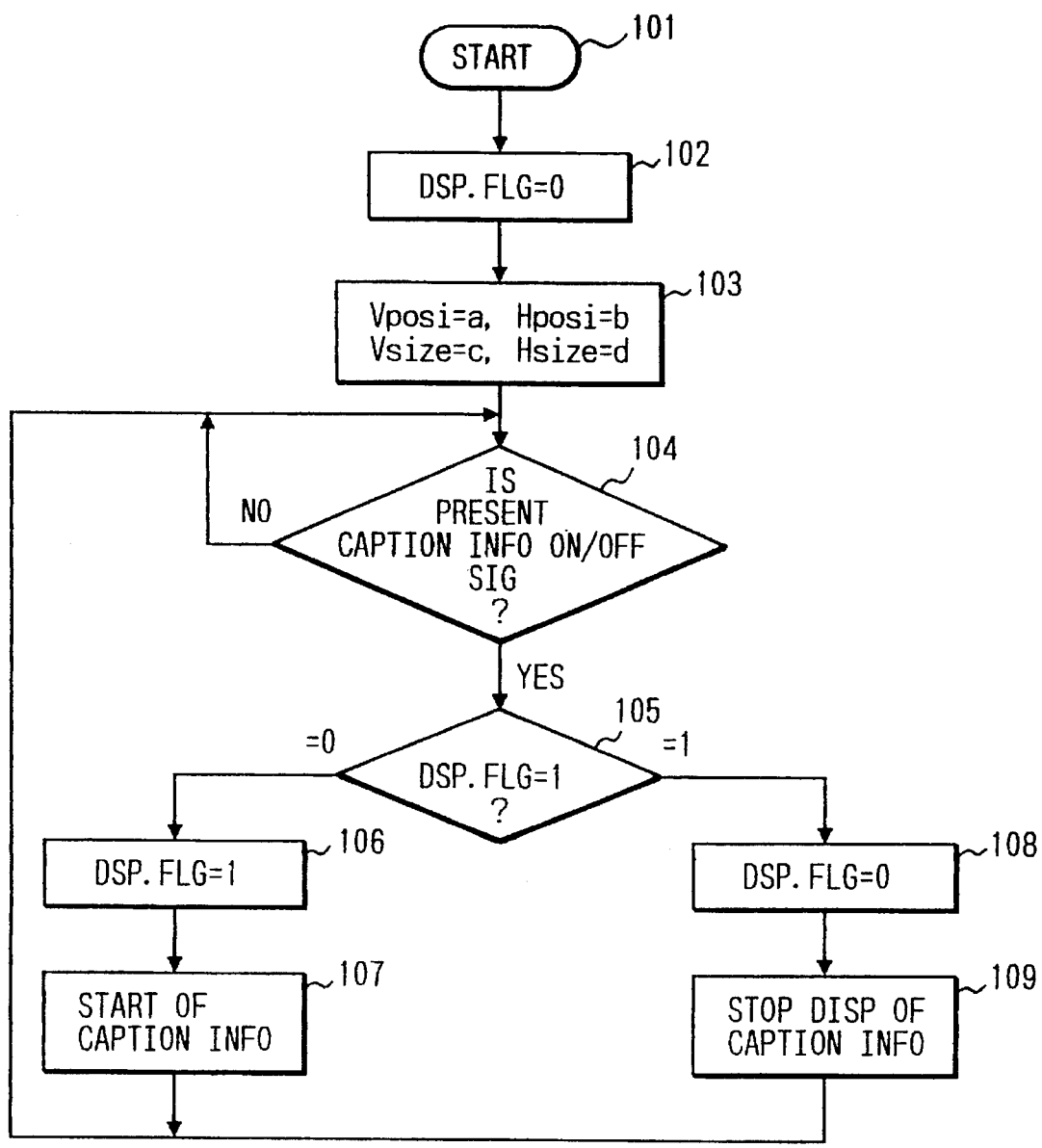
FIG. 9 shows a flow chart of an operation of the prior art decoding unit shown in FIG. 8.

FIG. 7 is a general block diagram of the television receiver of the invention and is also used in the description of the prior art. FIG. 1 is a block diagram of this invention showing a caption information processing unit shown in FIG. 7.

Figure 5A:
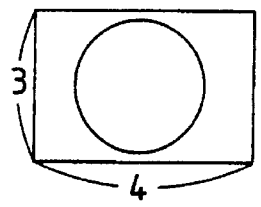
FIG. 5A is an illustration for showing a picture plane of a prior art television.
Figure 5B:
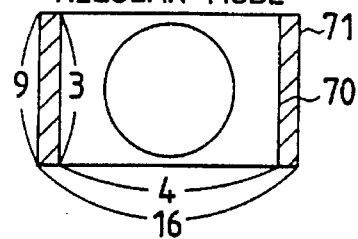
FIGS. 5B to 5D are illustrations of this invention for showing respective displaying modes on the oblong CRT wherein a circle represented by a video signal for the standard type CRT having the aspect ratio of 4:3 and are also used in the description of the prior art.
Figure 5C:
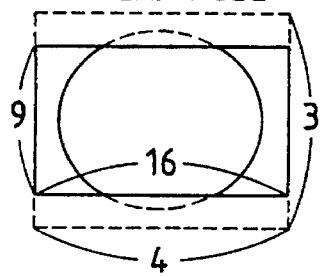
Figure 5D:
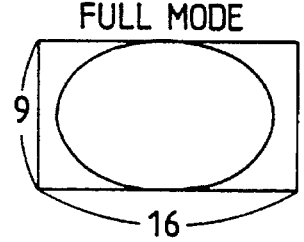

A transmitted composite video signal including a caption information (character information) is received by an antenna 1. The received composite video signal is converted to have an intermediate frequency by the tuner 2. The composite video signal having the intermediate frequency is amplified by an intermediate frequency amplifier which further includes a video signal detection circuit for detecting the composite video signal. The detected composite video signal is supplied to a video signal processing circuit 4 and to the caption information processing circuit 8a. The video signal processing circuit 4 effects the Y/C separation, color reproduction, and matrix processings. An output of the video signal processing circuit 4 is supplied to a well-known display size conversion circuit 5. The display size conversion circuit 5 effects a display size conversion in accordance with a mode signal 31. When the size mode signal 31 indicates non-conversion, that is, the received video signal is for an oblong CRT 7 having an aspect ratio of 16:9, the display size conversion circuit 5 outputs the video signal from the video signal processing circuit 4 without conversion. When the size mode signal 31 indicates the another mode, that is, the received video signal is for a standard CRT (not shown) having an aspect ratio of 4:3, the display size conversion circuit 5 converts the video signal into another video signal which is suitable for reproduction of the video signal on the oblong CRT 7 having the aspect ratio of 16:9 as shown in FIGS. 5B, 5C, and 5D. That is, the video image is displayed on the oblong CRT 7 in a regular mode where there are non-displayed areas at both sides of the CRT 7, in a cinema mode where there are omitted areas at top and bottom portions, or in a full mode where all picture image displayed but the aspect ratio is unnatural. This processing is carried out using a digital compression technique of the video signal in the time base. An output of the display size conversion circuit 5 is sent to the RGB drive circuit 6 included a display portion 7a.

The caption signal processing circuit 8a separates the caption information from the detected video signal and outputs character color data signals R, G, and B indicative of color of characters to be displayed and a switching signal Ys indicative of switching between the video signal from the display size conversion circuit 5 and the character color data signals which are produced in accordance with the caption information. The character color data signals R, G, and B and the switching signal Ys are sent to the RGB drive circuit 6 in accordance with a caption information on/off signal 32 and the size mode signal 31. When the caption information on/off signal 32 indicates the non-conversion, the RGB drive circuit 6 outputs RGB drive signals produced from the video signal from the display size conversion circuit 5 to the CRT 7 because the switching signal Ys remains indicative of outputting only video signal. When the caption information on/off signal 32 indicates ON of displaying, the RGB drive circuit 6 outputs RGB drive signals with the character color data signals R, G, and B superimposed in response to the switching signal Ys to the CRT 7. A synchronizing circuit 9 separates horizontal and vertical signals from an output signal of the video signal processing circuit 4 and sends the horizontal and vertical synchronizing signals to a horizontal and vertical scanning circuit 10. The horizontal and vertical scanning circuit 10 has oscillators for producing a horizontal scanning signal of 15.75 kHz and a vertical scanning signal of 60 Hz in response to the horizontal and vertical synchronizing signals from the synchronizing circuit 9 respectively. When the horizontal synchronizing and vertical synchronizing signals are absent, each oscillators performing self-oscillation at a frequency determined by constants of circuit elements thereof when no signal is inputted. A horizontal and vertical deflection circuit 10 supplies horizontal and vertical deflection drive signals to a deflection unit 7b of the CRT 7 in response to the horizontal and vertical synchronizing signals from the synchronizing circuit 9. The horizontal and vertical deflection circuit 10 also performs the displaying size conversion in the cinema mode by over-scanning in response to the size mode signal 31. The horizontal and vertical deflection circuit 10 also supplies flyback pulses of the vertical synchronizing signals to the caption information processing circuit 8a. The caption information processing circuit 8a determines timing for positioning the caption information, (i.e., characters and marks on the image plane of the CRT 7) in response to the horizontal and vertical synchronizing signals from the horizontal and vertical deflection circuit 10.

As shown in FIG. 1, the caption information processing circuit 8a comprises a front end unit 11, a decoding unit 12, and a display control unit 13. The front end unit 11 receives the composite video signal from the intermediate frequency amplifier 3 and extracts the caption signal multiplexed in the composite video signal at 21st and 284th lines to send the caption signal to the decoding unit 12. The decoding unit 12 decodes the caption signal and supplies display data to the display control unit 13 when the displaying of the caption information is commanded by a caption information on/off signal 32. The display control unit 13 supplies R, G, and B character color signals indicative of color of the characters superimposed in the reproduced video image to the RGB drive circuit 6 with color of characters and timing of these signal determined in accordance with the received caption information, the horizontal and vertical signals supplied from the horizontal and vertical deflection circuit 10, and an oscillation signal produced by an oscillation circuit 13b to the RGB drive circuit 6. The display control unit 13 also supplies a switching signal Ys indicative of timing of switching between the R, G, and B drive signals and the R, G, and B character color signals to the RGB drive circuit 6 with timing of the switching signal Ys determined in accordance with the received caption information; the horizontal and vertical signals supplied from the horizontal and vertical deflection circuit 10; and the oscillation signal.

More specifically, the decoding unit 12 comprises a character decoding circuit 12a for decoding the caption signal sent from the front end unit 11 to obtain information of characters to be superimposed on the picture plane of the CRT 7 in response to the caption information on/off signal 32 and a position data decoding circuit 12b for decoding the caption signal to obtain positional information of characters to be superimposed; a memory 21 for storing a set of positional data, for displaying the characters, relating to the size modes, namely, vertical start data, horizontal start data, vertical size data, and horizontal size data, and a position and size control circuit 22 for modifying the data read from the memory 21 in accordance with a size mode signal 31.

The character decoding circuit 12a decodes the caption information to obtain decoded information of characters to be superimposed on the reproduced video image. The decoded information of characters is sent to a V RAM (random access memory for storing video data) 13c. The position data decoding circuit 12b decodes the caption signal to obtain positional information of a character within a display region of character information and sends the positional information to a display control circuit 13a of the display control unit 13.

Figure 6A:
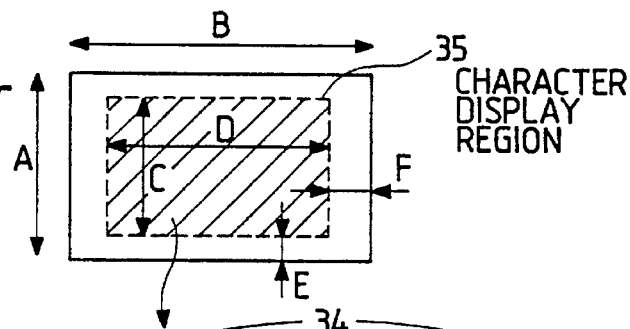
FIG. 6A is an illustration of this invention for showing a relation between the size of a CRT 7 and a region for displaying the caption information and is also used in the description of the prior art.

The memory 21 stores vertical start position data, horizontal start position data, size data indicative of vertical and horizontal sizes of a section for displaying one character to produce the display region as shown in FIGS. 6A and 63.

Figure 11:
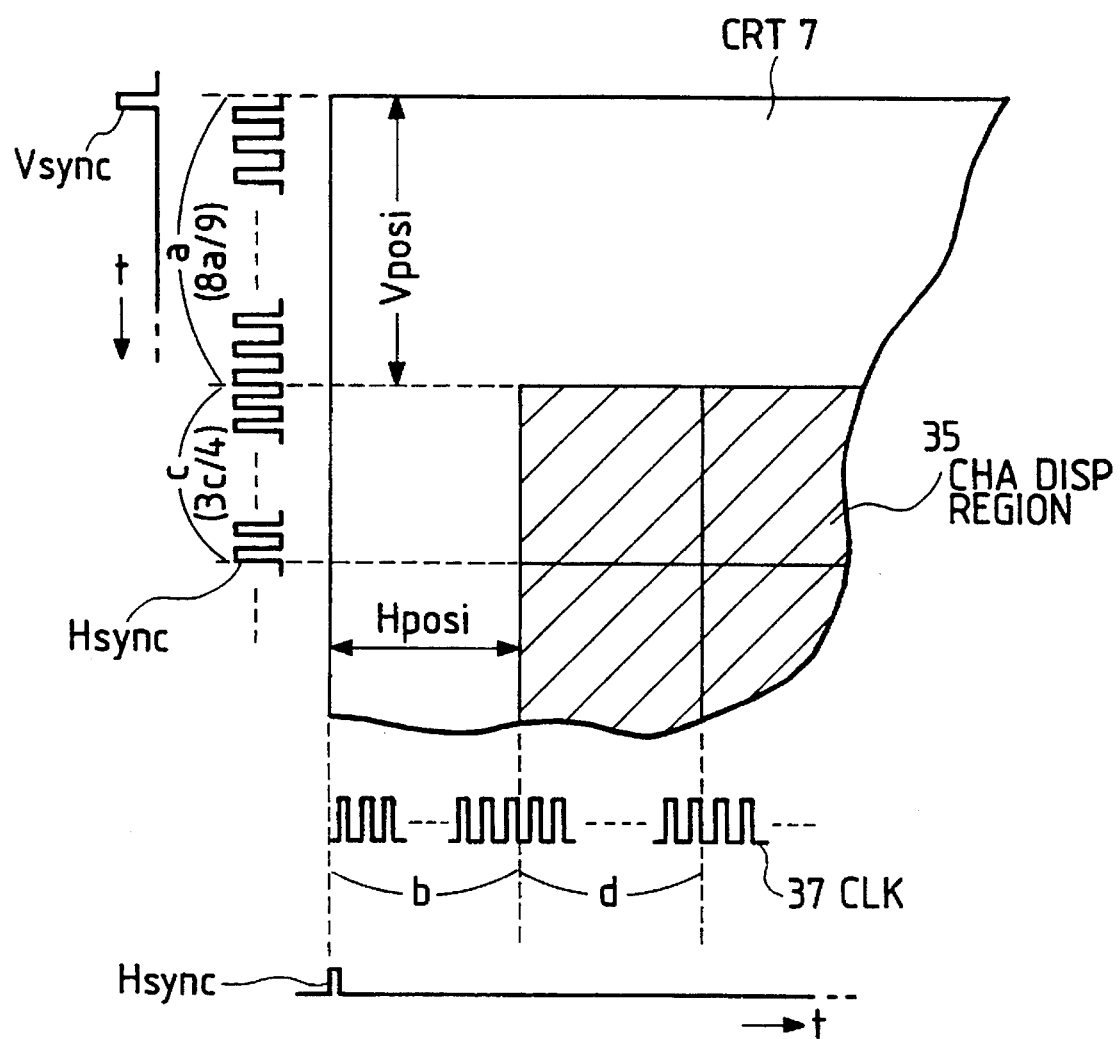
FIG. 11 is an illustration of this invention for showing the vertical and horizontal start position data and vertical and horizontal size data.

FIG. 6A is an illustration for showing a relation between the size of a CRT 7 and a region for displaying the caption information, namely, a character display region 35 which is represented by the hatched portion. FIG. 6A is also used in the description of the prior art. In FIG. 6A, A denotes a height of the CRT; B denotes a width of the CRT 7; C denotes a height of the character display region 35; D denotes a width of the character display region 35; E denotes a vertical end position; and F denotes a horizontal end position. These sizes A to F are predetermined for the oblong CRT 7. FIG. 11 is an illustration of this invention for showing the vertical and horizontal start position data and vertical and horizontal size data. The vertical start position data Vposi indicates a vertical distance between top lift corner of the CRT 7 and the character display region 35. The horizontal start position data Hposi indicates a horizontal distance between top left corner of the CRT 7 and the character display region 35. The vertical size data Vsize indicates a vertical size of one section included in the character display region 35, each section indicative of an area on which one character is to be displayed. The horizontal size data Hsize indicates a horizontal size of one section. More specifically, the memory 21 stores values set to counters included in the display control circuit 13a. That is, the memory 21 stores a value "a" for Vposi; a value "b" for Hposi; a value "c" for Vsize; and a value "d" for Hsize.

Figure 6B:
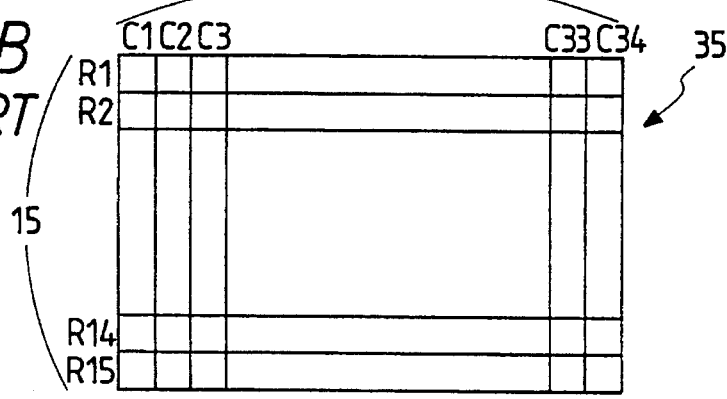
FIG. 6B is an illustration of this invention for showing a map of displayed characters within the character display region and is also used in the description of the prior art.

FIG. 6B is an illustration for showing a map of displayed characters within the character display region 35 and is also used in the description of the prior art. The character display region 35 includes 34 rows and 15 columns wherein the first and 34th columns are not used for displaying and one character is displayed on one section defined by one row and one column.

The memory 21 supplies the vertical and horizontal start position data and vertical and horizontal size data to the position and size control circuit 22.

The position and size control circuit 22 modifies the vertical and horizontal start position data and vertical and horizontal size data from the memory 21 in accordance with the mode of the reproduction of the video signal, namely, the size mode signal 31 to display characters of the caption information at suitable positions respectively.

The display control unit 13 comprises the display control circuit 13a; an oscillation circuit 13b; a V RAM 13C; a character ROM 13d; an attribute control circuit 13f; and an output control circuit 13e. The V RAM 13c stores character data obtained by decoding the caption information and supplies an address signal to the character ROM 13d as a character address data. The character ROM 13d supplies character font data to the output control circuit 13e in response to a timing signal from the display control circuit 13a. The output control circuit 13e supplies R, G, and B character color signals and the switching signal Ys to the RGB drive circuit 6 in response to an output of the oscillation circuit 13d.

The display control circuit 13a supplies the timing signal for displaying the character font data from the character ROM 13d at the commanded position with a suitable size. That is, the display control circuit 13a produces the timing signal using the horizontal synchronizing signal Hsync to determine timing of the vertical displaying of the character and using the clock signal 37 outputted from the oscillation circuit 13b to determine timing of displaying of the characters in the horizontal direction. The oscillation circuit 13d is controlled to output the clock signal 37 in response to the vertical synchronizing signal Vsync.

Figure 12:
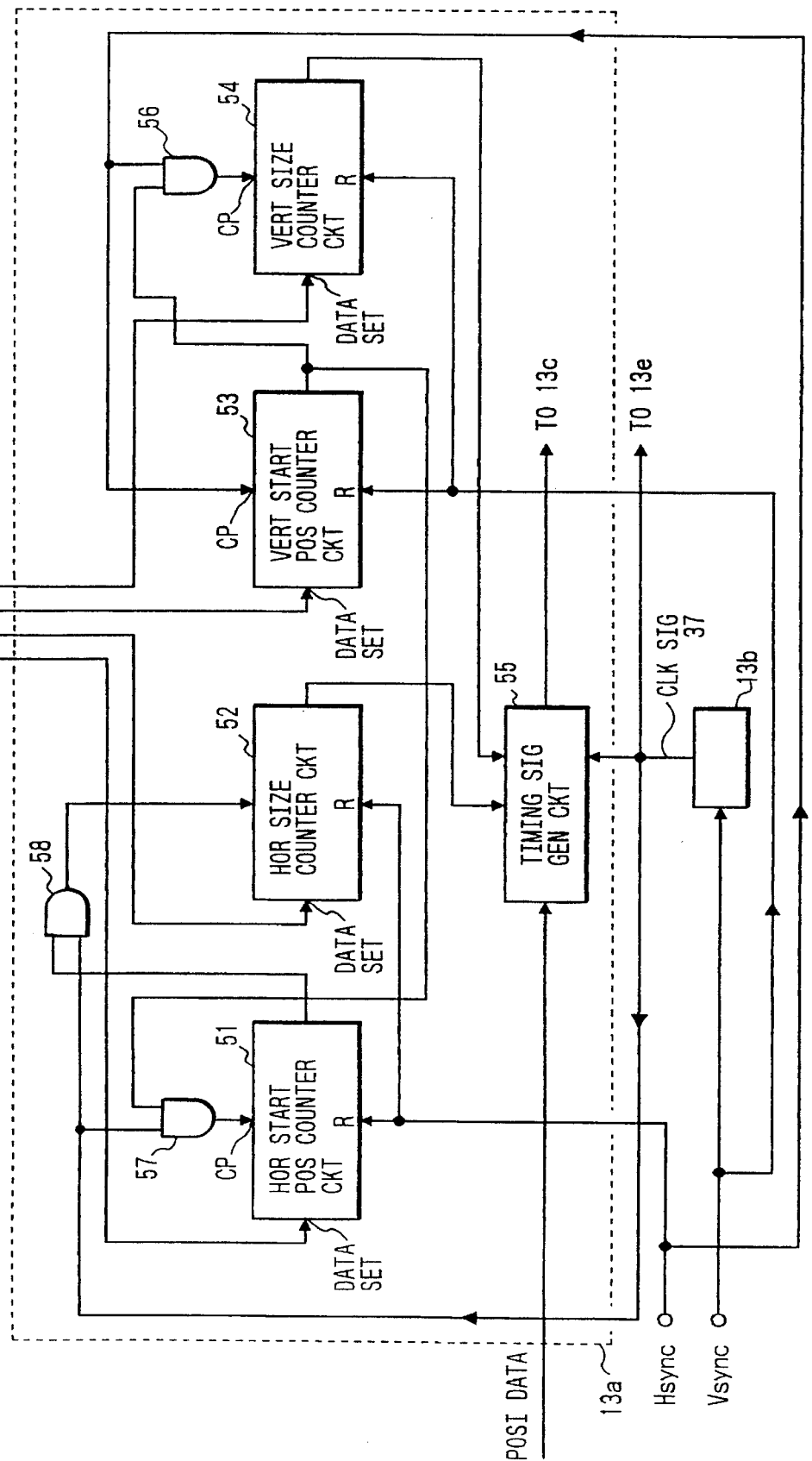
FIG. 12 is partial a block diagram of this invention for showing the display control circuit shown in FIG. 1.

FIG. 11 also shows a timing relation between the vertical synchronizing signal Vsync, horizontal synchronizing signal Hsync, and the clock signal 37 produced by the oscillation circuit 13b. FIG. 12 is partial a block diagram of this invention for showing the display control circuit 13a shown in FIG. 1. The display control circuit 13a comprises a horizontal start position counter circuit 51; a horizontal size counter circuit 52; a vertical start position counter circuit 53; a vertical counter circuit 54; and a timing signal generation circuit 55. The vertical start position counter 53 counts pulses of horizontal synchronizing signal Hsync after reception of the vertical synchronizing signal Vsync supplied to a reset input (R) thereof. The position and size control circuit 22 sets the vertical start potion Vposi, for example "a", to the vertical start position counter circuit 53 and the count value is reset by the vertical synchronizing signal, so that when the vertical start position counter circuit 53 counts pulses of the horizontal synchronizing signal corresponding to Vposi, the vertical start position counter circuit 53 provides a vertical start timing from the top left corner of the picture plane. The vertical start timing starts counting of the horizontal synchronizing signal by the vertical size counter circuit 54 and horizontal start position counter circuit through AND gates 56 and 57 respectively. The horizontal start position counter circuit 51 counts the clock signal 37 in response to the vertical start timing and provides a horizontal start timing because the horizontal start position Hposi, for example "b" is set to this counter circuit 51 through a data set input thereof. This counter circuit 51 is reset by the horizontal synchronizing signal Hsync. Therefore, the horizontal start position counter 51 provides a horizontal start timing signal. The horizontal start timing signal starts the horizontal size counter circuit 52 through an AND gate 58. The horizontal size counter circuit 52 counts the clock signal 37 in response to the horizontal start timing and provides a timing signal indicative of horizontal position of characters because the value of the horizontal size Hsize, for example "d" is set to this counter circuit 52 through a data set input thereof. This counter circuit 51 is reset by the horizontal synchronizing signal Hsync. Therefore, the horizontal size counter circuit 52 provide timing of each of columns C1 to C34 at each of rows R1 to R15. The vertical size counter circuit 54 counts the horizontal synchronizing signal Hsync in response to the vertical start timing and provides a timing signal indicative of vertical position of characters because the value of the horizontal size Hsize, for example "d" is set to this counter circuit 54 through a data set input thereof. This counter circuit 54 is reset by the vertical synchronizing signal Vsync. Therefore, the vertical size counter circuit 54 provides timing of each start at rows R1 to R15. The vertical size counter circuit 54 outputs a row signal indicative of which row is displayed now and the horizontal size counter circuit 52 outputs a column signal indicative of which column is displayed now. The timing signal generation circuit 55 outputs the timing signal to the V RAM 13c in response to the clock signal 37 when the column signal and the row signal agree with the position data sent from the position data decoding circuit 12b. That is, the timing signal generation circuit 55 includes a comparing circuit (not shown) for comparing the column signal and row signal with the position data and a gate circuit (not shown) for outputting the timing signal when the column signal and the row signal agree with the position data.

FIGS. 5B to 5D are illustrations for showing respective displaying modes wherein a circle represented by a video signal for the standard type CRT having the aspect ratio of 4:3 is displayed on the oblong CRT 7 and are used in the description of the invention. FIG. 5A is an illustration for showing a picture plane of a prior art television where a circle represented by the video signal for the standard type GET having the aspect ratio of 4:3 is displayed. If this video signal is displayed on the television receiver having the oblong CRT 7 with the aspect ratio of 16:9 without a compression processing, the circle is displayed in an oval (hereinafter, this mode is referred to as a full mode) as shown in FIG. 5D. Then, a compression processing for compressing the video signal in the horizontal direction is carried out to make the oval close to the circle as shown in FIG. 5B (hereinafter this mode is referred to as a regular mode). In this mode, though there are non-displayed areas, i.e., black areas at both side of the CRT 7, the circle is correctly reproduced. In other words, a frame 70 of picture plane of the video signal to be reproduced on the GET having the aspect ratio of 4:3 is provided within a frame 71 of the CRT 7. FIG. 5C shows a condition that the video signal is displayed with the aspect ratio of the displayed image unchanged by over-scanning of the horizontal and vertical deflection circuit 10 in response to the size mode signal 31. That is, the video image is enlarged in the vertical direction compared with the full mode as shown in FIG. 5D (this mode is referred to as a cinema mode). The user cannot watch the areas within the chain lines in FIG. 5C. However, this cinema mode provides the most strong appeal to the user. Therefore, this cinema mode is suitable for reproducing a cinema. In this mode about 80% of the original video image is reproduced. In other words, about 380 horizontal scanning lines are reproduced though the original video image includes about 480 horizontal scanning lines.

In the full mode as shown in FIG. 5D, the position and size control circuit 22 outputs the vertical and horizontal start position data Vposi=a and Hposi=b as they are and the vertical and horizontal size data Vsize=c and Hsize=d to the display control circuit 13a.

In the cinema mode as shown in FIG. 5C, the vertical start position and size data are modified.

Figure 10A:
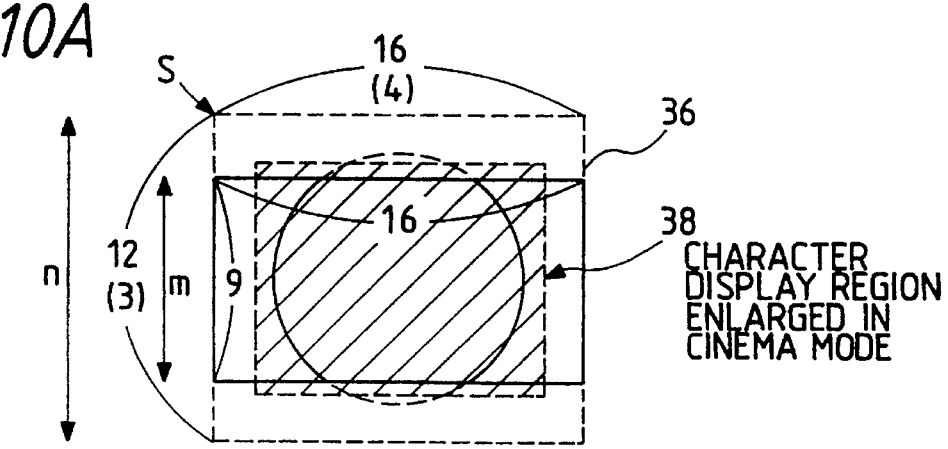
FIG. 10A is an illustration of this invention for showing an image plane of the CRT in the cinema mode as shown in FIG. 5C.

FIG. 10A is an illustration for showing an image plane of the CRT 7 in the cinema mode as shown in FIG. 5C. A frame denoted by a solid line indicates the picture plane of the CRT 7 with the aspect ration of 16:9 and an outer frame denoted by a chain line denotes an imaginary picture plane of a video signal for the standard CRT having the aspect ratio of 4:3 wherein the video signal is time-expanded to enlarge the original picture plane to produce the imaginary image plane with an aspect ratio of 16:12. An inner frame denoted with a chain line indicates the original image plane of the standard CRT.

In FIG. 10A, a ratio between a vertical size of the imaginary enlarged picture plane 36 and that of the picture plane of the CRT 7 is given:

$$n{:}m = 4{:}3$$

Therefore, in order to display the character information fully on the CRT 7, the vertical size of a section is compressed, i.e., the vertical size of the character region 35 is ¾ times that of the imaginary picture plane 36. Timing of the vertical start position Vposi is delayed for an interval given:

$$(1 - m/n) \times \tfrac{1}{2} = \tfrac{1}{8}$$

More specifically, the vertical size of ¾-compression is obtained by counting ¾ times the value c, namely, ¾c, of pulses of the horizontal synchronizing signal Hsync. The delaying the start timing is obtained by increasing the value a which is given by:

$$(1 + \tfrac{1}{8})a = (9/8)a.$$

The counting is started from the position S as shown in FIG. 10A because in the cinema mode the horizontal and vertical deflection circuit 10 perform over scanning.

Therefore, the position and size control circuit 22 modifies the vertical start position data Vposi and vertical size data Vsize such that Vposi=(9/8) a and Vsize=(¾)c in the cinema mode and outputs the result to the display control circuit 13a. The display control circuit 13a includes vertical counters. The value (9/8)a is set to a vertical start position counter 53 which counts the horizontal synchronizing signal Hsync to provide a start timing of the vertical size counter 54 and the horizontal start position counter 51. The value ¾c is set to the vertical size counter 54 which counts pulses of the horizontal synchronizing signal to provide the row signal. The horizontal start position and horizontal size data are outputted and set to the horizontal start counter 51 and horizontal size counters 52 from the position and size control circuit 22 as they are.

As mentioned above, all caption information multiplexed in the video signal for the standard television having a CRT with the aspect ratio of 4:3 is suitably displayed on the oblong CRT having the aspect ratio of 16:9 in the cinema mode. However, in this condition, the vertical positions of characters slightly deviates from those on the standard type television with the aspect ratio of 4:3 and the vertical size of each character is slightly small.

Therefore, it is better to compensate the shape of each character by reduction of horizontal size by increasing a frequency of the clock signal 37.

Figure 10B:
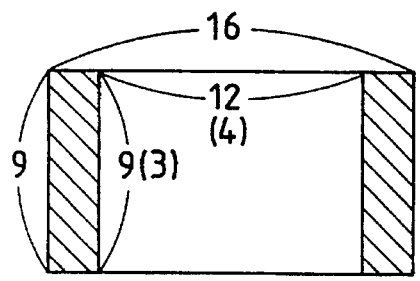
FIG. 10B is an illustration of this invention for showing the picture plane in the regular mode.
Figure 10C:
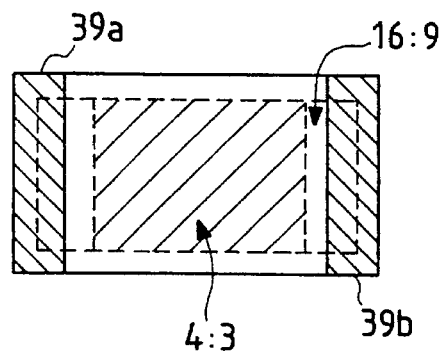
FIG. 10C is an illustration of this invention for showing a relation between the picture plane of the CRT and the character display region in the regular mode.

FIG. 10B is an illustration for showing the picture plane in the regular mode. FIG. 10C is an illustration for showing a relation between the picture plane of the CRT 7 and the character display region 85 in the regular mode. In the regular mode, the video signal for the standard type television having a CRT with the aspect ratio of 4:3 is fully displayed on the oblong CRT 7 and the caption information can be also displayed on the oblong CRT 7. However, as shown in FIG. 10C, the caption information is displayed with a horizontal size of the frame of the character display region enlarged at a ratio of 16/12=4/3 with respect to the picture plane of the video signal in the regular mode. That is, the left and right sides of the character display region ranges over the non-displayed areas 39a and 39b.

Therefore, the aspect ratio of the frame of the character display region 35 should be restored to the original aspect ratio of 4:3. That is, the horizontal size is ¾-compressed and the horizontal start position or the horizontal start timing is delayed by the width of the left non-display region 39a. Namely, the horizontal start timing is delayed by:

$(1-¾) \times ½ = ⅛$

In order to ¾-compression, data to be set to the horizontal size counter 52 is obtained by multiplication of "d" by ¾. The delaying of the horizontal start timing is obtained by data to be set to the horizontal start position counter 51 is obtained by multiplication of "b" by $(1+⅛) = 9/8$.

The position and size control circuit 22 modifies the data "b" (read from the memory 21) to be set to the horizontal start position counter 51 such that Hposi= (9/8)b and the data "d" (read from the memory 21) to be set to the horizontal size counter 52 such that Hsize=(¾) d.

The data for determining the vertical start position Vposi and the vertical size Vsize are outputted as they are.

Therefore, the characters displayed in accordance with the caption information ranges within the display region of the video signal in the regular mode and the aspect ratio of a character is corrected because the aspect ratio is restored to the original aspect ratio.

Figure 2:
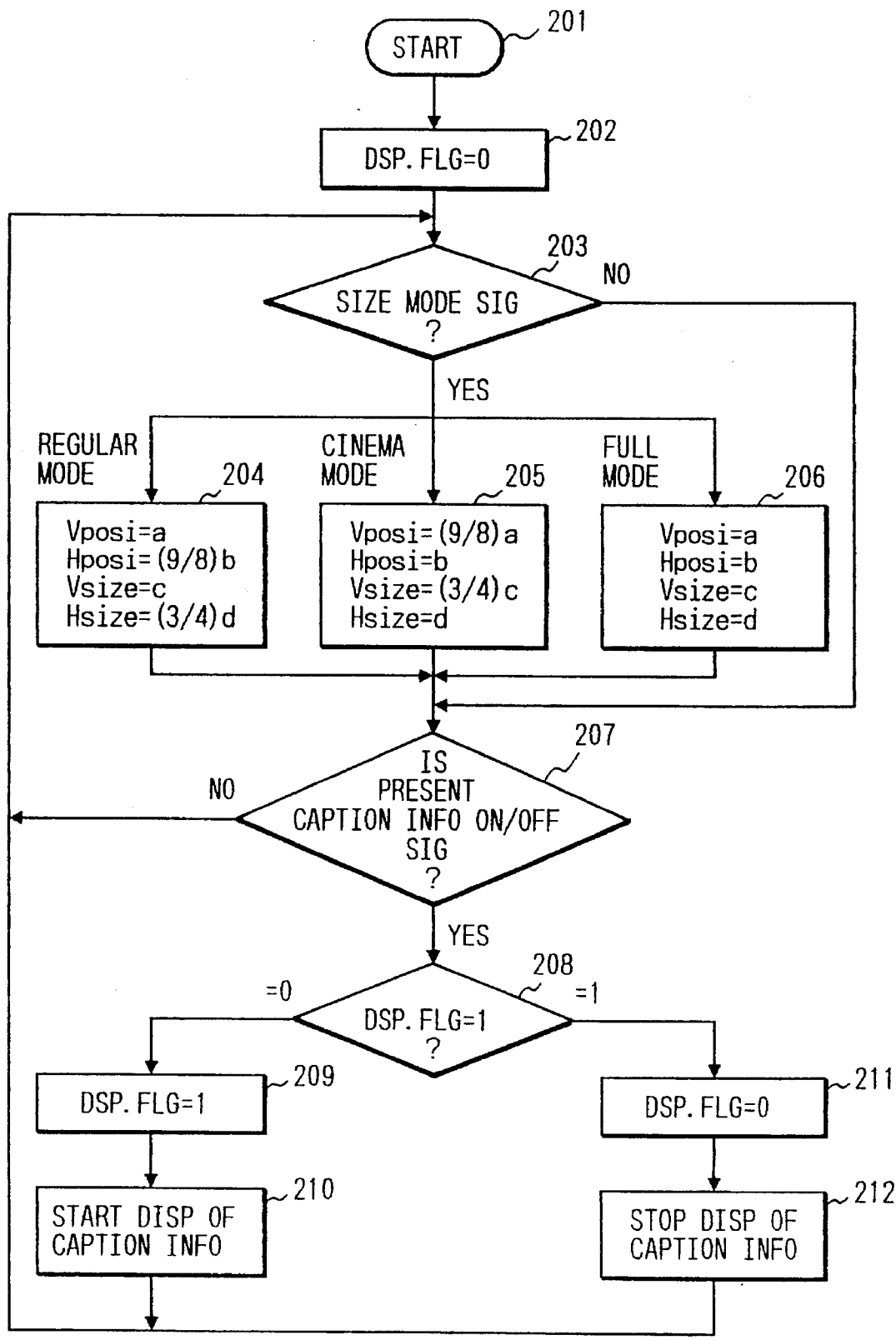
FIG. 2 shows a flow chart of the first embodiment of this invention.

FIG. 2 shows a flow chart of this embodiment of this invention. The decoding unit 12 includes a microprocessor (not shown) and executes a stored program as shown in the flow chart shown in FIG. 2. Processing starts at step 201. In the following step 202, a flag indicative of displaying/non-displaying of the caption information (DSP.FLG) is reset. In the following step 203, a decision is made as to whether or not the size mode signal is inputted and which mode is commanded. If the regular mode is commanded, processing proceeds to step 204. In step 204, data of Vposi (a), Hposi (b), Vsize (c), and Hsize (d) are read from the memory 21 and data of Hposi is multiplied by (9/8), namely, Hposi=(9/8)b is obtained. Similarly, data of Hsize is multiplied by (¾), namely, Hposi=(¾)d is obtained. These data are sent to the display control circuit 13a.

If the cinema mode is commanded in the step 203, processing proceeds to step 205. In step 205, data of Vposi (a), Hposi (b), Vsize (c), and Hsize (d) are read from the memory 21 and data of Vposi is multiplied by (9/8), namely, Vposi=(9/8)a is obtained. Similarly, data of Vsize is multiplied by (¾), namely, Hposi=(¾)c is obtained. These data are sent to the display control circuit 13a.

If the full mode is commanded, processing proceeds to step 206. In step 206, data of Vposi (a), Hposi (b), Vsize (c), and Hsize (d) are read from the memory 21 and these data are sent to the display control circuit 13a without modification. Then, processing proceeds to step 207. In step 203, if the size mode signal is absent, processing directly proceeds to step 207. After processing in the step 204 and 205, processing proceeds to step 207 also.

In step 207, a decision is made to as whether or not the caption information on/off signal is present. In the absence of the caption information on/off signal, processing returns to step 203. In the presence of the caption information on/off signal, processing proceeds to step 208. In step 208, a decision is made as to whether or not the displaying/non-displaying flag of the caption information (DSP.FLG) has been set. If the displaying/non-displaying flag has been set to 0, the flag is set to 1. In the following step 210, the displaying of the caption information is started. That is, the character decoding circuit 12 starts outputting the decoded caption information. If the displaying/non-displaying flag has been set to 1, the flag is set to 0. In the following step 212, the displaying of the caption information is stopped. That is, the character decoding circuit 12 stops the outputting of the decoded caption information.

Hereinbelow will be described a second embodiment of this invention.

Figure 3:
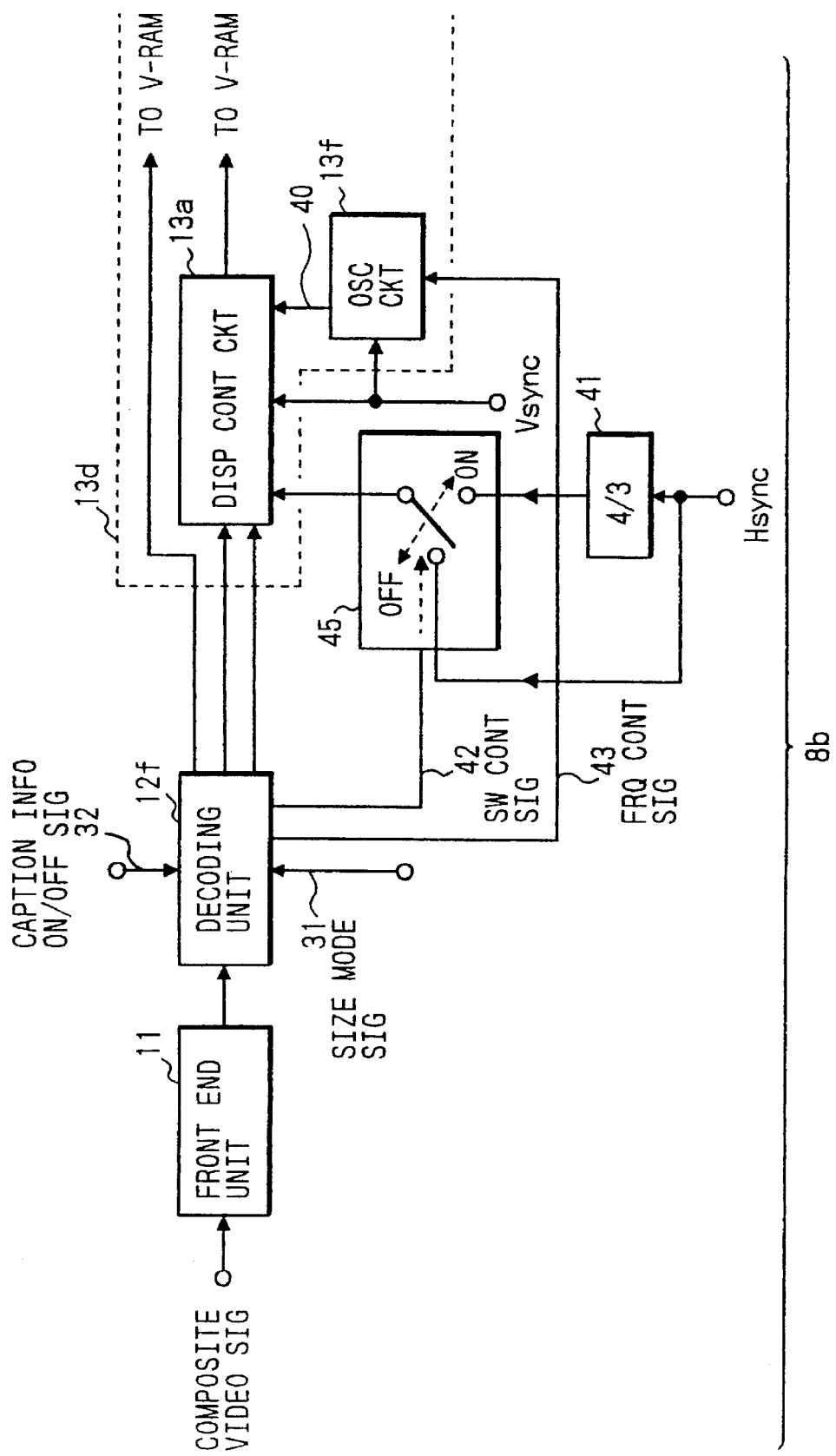
FIG. 3 is a partial block diagram of the second embodiment of this invention.

FIG. 3 is a partial block diagram of the second embodiment of this invention.

In the first embodiment, changing of the vertical or horizontal start position and vertical or horizontal size is performed by modification of the data set to the counters included in the display control circuit 13. In contrast, in the second embodiment, a frequency of the input signal of the vertical start position and size counters 53 and 54 and horizontal start position and size counters 51 and 52 in the display control circuit 13 is changed. That is, the horizontal synchronizing signal Hsync is 4/3-frequency multiplier and a frequency of a clock 40 of a oscillation circuit 13f is varied in accordance with the size mode signal from the standard frequency f1. A switching circuit 45 is provided to supply the horizontal synchronizing signal to the display control circuit 13a directly or through the 4/3-frequency multiplier 41 in accordance with a switching control signal 42. Therefore, the position and size control circuit 22 does not modifies the data read from the memory 21 in accordance with the size mode signal 31 basically. In addition, the decoding unit 12f outputs the switching control signal 42 and frequency control signal 43 and its other functions are the same as the decoding unit 12e of the first embodiment.

In the full mode, all caption information can be displayed without compression or enlargement. Therefore, the horizontal synchronizing signal is supplied to the display control circuit 13 directly through the switching circuit 45. The decoding unit 12f outputs the switching control signal 42 to cause the switching circuit 45 to transfer the horizontal signal directly, that is, the switching circuit 45 is moved to the OFF position. The decoding unit 12f supplies a frequency control signal 43 to the variable oscillator 13f. In this mode, the decoding unit 12f causes the variable oscillator 13f to oscillate at the standard frequency f1, that is, the frequency for displaying the character information on the oblong CRT 7 with the aspect ratio of 16:9 with video signal for the oblong CRT 7 having the aspect ratio of 16:9. The decoding unit 12f reads data of Vposi=a, Vsize=c, Hposi=b, and Hsize=d are set to respective counters in the display control circuit 13a.

In the cinema mode, the vertical size of the character display region 35 should be ¾-compressed vertically. In the first embodiment, data set to the vertical start position counter circuit 53 and vertical size counter circuit 54 are modified. However, in the second embodiment, the data set to these counter circuits are unchanged basically but the frequency of the horizontal synchronizing signal is 4/3-frequency multiplied. This compresses the vertical size of the display region 25 also. The decoding circuit 12f outputs the switching control signal 42 to cause the switching circuit 45 to supply the 4/3-frequency-multiplexed horizontal synchronizing signal to the display control circuit 13a. The frequency of the variable oscillation circuit 13f is set to the standard frequency f1.

Preferably, because in the condition mentioned above, the shape of a character is oblong, the frequency of the variable oscillation circuit 13f is slightly increased to compensate the shape of the character.

In this cinema mode, the data set to the respective counters in the display control circuit 13a are Vposi (7/6)a, Vsize=c, Hposi=b, and Hsize=d. Here, the reason why the Vposi is not (9/8)a which is used in the first embodiment, is that the frequency of the horizontal synchronizing signal is obtained by 4/3-frequency-multiplying the horizontal synchronizing signal Hsync, so that the data set to the vertical start counter circuit 53 is compensated to match the 4/3-frequency-multiplied frequency. That is, Vposi is given by:

$Vposi=\{1+(1+(⅛)-(4/3)\}a=(7/6)a.$

In the regular mode, the horizontal size of the character display region 35 should be ¾-compressed. The horizontal size of the character display region is determined by the count of the pulses of clock signal 40 of the oscillation circuit 13f. Therefore, the horizontal size of the character display region 35 can be compressed by 4/3-frequency multiplying the frequency of the oscillation circuit 13f similarly when the data set to the horizontal size counter is unchanged. It is unnecessary to change the vertical size of the character display region, so that the switching circuit 45 is switched to the OFF position, that is, the horizontal synchronize signal is supplied to the display control circuit 13a directly.

In the regular mode, the data set to the counters in the display control circuit 13 are Vposi=a, Vsize=c, Hposi=(7/6)b, and Hsize=d. Here, the reason why the Hposi is not (9/8)b which is used in the first embodiment, is that the frequency of the clock signal 40 is obtained by 4/3-frequency-multiplying the standard frequency f1, so that the data set to the horizontal start position counter 51 is compensated to match the frequency of the oscillation circuit 13f. That is, Hposi is given by:

$$Vposi=\{1+(1+(1/8)\cdot(4/3)\}b=(7/6)b.$$

Figure 4:
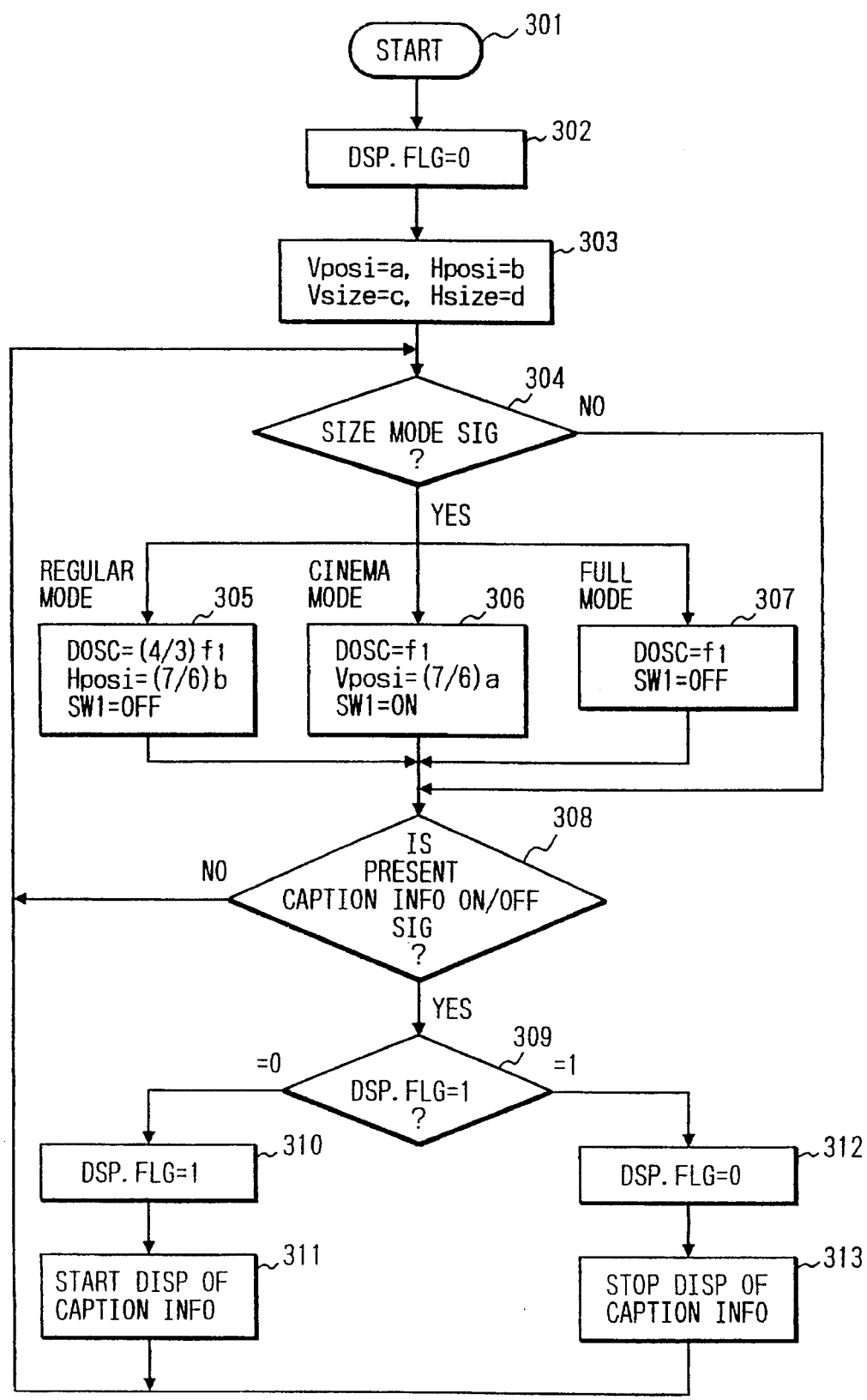
FIG. 4 shows a flow chart of the second embodiment of this invention.

FIG. 4 shows a flow chart of the second embodiment of this invention.

Processing start at step 301. In the following step 302, a flag indicative of displaying/non-displaying of the caption information (DSP.FLG) is reset. In the following step 303, the position and size control circuit 22 in the decoding unit 12f reads data of Vposi=a, Hposi=b, Vsize=c, and Hsize=d are read from the memory 21 and set them to the vertical start position and size counters 53 and 54 and horizontal start position and size counters 51 and 52 of the display control circuit 13 respectively. In the following step 304, a decision is made as to whether or not the size mode signal is present and which mode is commanded. If the regular mode is commanded, processing proceeds to step 305. In step 305, the decoding unit outputs the frequency control signal 43 to cause the oscillation circuit 13f to change the frequency of its output to a frequency 4/3 times the standard frequency f1; modifies the data set to the horizontal start counter to Hposi=(7/6)b and sets the modified data to the horizontal start position counter 51; and outputs the switching control signal 42 to switch the switching circuit 45 to OFF position.

In step 304, if the cinema mode is commanded, processing proceeds to step 306. In step 306, the decoding unit 12f outputs the frequency control signal 43 to cause the oscillation circuit 13f to set the frequency of its output to the standard frequency f1; modifies the data set to the vertical start counter circuit 53 to Vposi= (7 6)a and sets the modified data to the horizontal start position counter circuit 51; and outputs the switching control signal 42 to switch the switching circuit 45 to ON position.

In step 304, if the full mode is commanded, processing proceeds to step 807. In step 307, the decoding unit 12f outputs the frequency control signal 43 to cause the oscillation circuit 13f to change the frequency of its output to the standard frequency f1 and outputs the switching control signal 42 to switch the switching circuit 45 to the OFF position. Then processing proceeds to step 308. In step 304, if the size mode signal is absent, processing directly proceeds to step 308. After processing of steps 305 and 306, processing proceeds to step 308 also.

In step 308, a decision is made to as whether the caption information on/off signal is present. In the absence of the caption information on/off signal, processing returns to step 304. In the presence of the caption information on/off signal, processing proceeds to step 309. In step 309, a decision is made as to whether or not the displaying/non-displaying flag of the caption information (DSP.FLG) has been set. If the displaying/non-displaying flag has been set to 0, the flag is set to 1 in step 310. In the following step 311, the displaying of the caption information is started. That is, the character decoding circuit 12 starts outputting the decoded caption information. If the displaying/non-displaying flag has been set to 1, the flag is set to 0 in step 312. In the following step 313, the displaying of the caption information is stopped. That is, the character decoding circuit 12a stops the outputting of the decoded caption information.

In the second embodiment, the switching circuit 45 and the 4/3-frequency multiplier 41 are used. However, a variable n/m-frequency multiplier (not shown) capable of changing the multiplying ratio in accordance with a control signal (not shown) supplied from the decoding unit 12f can be used and thus, the switching circuit 45 can be omitted.

Moreover, in the first and second embodiments, both horizontal and vertical start positions and character sizes are changed. However, it is effective that only horizontal start position and character size are controlled. For example, such controlling is effective to the regular mode. Further, it is also effective that only vertical start position and vertical character size are controlled. For example, such controlling is effective to the cinema mode.

For example, in a television receiver wherein only vertical start position and size are controlled in the cinema mode. In the regular mode, the caption information of characters can be displayed on the CRT 7 at a regular aspect ratio by feeding the output of the caption information processing circuit 8a to the display size converting circuit 5 though a picture quality of characters will decrease.

In the embodiments mentioned above, the video signal For the standard type of televisions having the aspect ratio of 4:3 is reproduced on the oblong CRT 7 at some aspect ratios. However, this invention is applicable to the combining of video signals for various aspect picture planes and character information picture plane.

What is claimed is:

1. A television receiver for reproducing a video image from a video signal to be reproduced to have a first frame with a first aspect ratio, said television receiver having display means having a picture plane having a second aspect ratio different from said first aspect ratio, said video signal including a picture signal and a coded character signal to be reproduced within said first frame, said coded character signal including character information and positional information of said character information, comprising:

(a) first converting means for converting said picture signal into a second picture signal to be reproduced to have a second frame with said first aspect ratio on said picture plane in accordance with a size mode signal;

(b) character signal processing means including:
decoding means for extracting said coded character signal and for decoding said coded character signal to obtain said character information and said positional information;
synchronizing signal detection means for detecting vertical and horizontal synchronizing signals from said video signal;
clock signal generation means for generating a clock signal in response to the vertical or the horizontal synchronizing signal;
storing means for storing position data of a predetermined region having a plurality of sections for displaying said character information and for storing size data of said sections; and modifying means for modifying said stored position data and size data in accordance with said size mode signal;

(c) displaying control means for determining a position of said predetermined region in accordance with said modified position data and for determining which section of said predetermined region said character information is displayed on in accordance with said positional information and for outputting said decoded character information at a timing determined in accordance with said determined section with reference to said horizontal synchronizing signal, said size data, and said clock signal, said display means displaying an image from said second picture signal and a character image from said outputted character information from said display control means with said character image superimposed on said displayed image, wherein said displaying control means outputs said decoded character information such that a size of said sections is controlled in accordance with said size mode signal due to said modifying said size data in accordance with said size mode signal by said modifying means.

2. A television receiver for reproducing a video image from a video signal to be reproduced to have a first frame with a first aspect ratio, said television receiver having display means having a picture plane having a second aspect ratio different from said first aspect ratio, said video signal including a picture signal and a coded character signal to be reproduced within said first frame, said coded character signal including character information and positional information of said character information, comprising:

(a) first converting means for converting said picture signal into a second picture signal to be reproduced to have a second frame with said first aspect ratio on said picture plane in accordance with a size mode signal;

(b) character signal processing means including:
decoding means for extracting said coded character signal and for decoding said coded character signal to obtain said character information and said positional information;
synchronizing signal detection means for detecting vertical and horizontal synchronizing signals from said video signal;
clock signal generation means for generating a clock signal in response to the vertical or the horizontal synchronizing signal;
storing means for storing vertical and horizontal position data of a predetermined region having a plurality of sections and for storing vertical and horizontal size data of said sections; and
modifying means for modifying said stored horizontal position data and horizontal size data in accordance with said size mode signal; and (c) displaying control means for determining a position of said predetermined region in accordance with said modified horizontal position data and for determining which section of said predetermined region said character information is displayed on in accordance with said positional information and for outputting said decoded character information at a timing determined in accordance with said determined section with reference to said horizontal synchronizing signal, said modified horizontal size data, and said clock signal, said display means displaying an image from said second picture signal and a character image from said outputted character information from said display control means with said character image superimposed on said displayed image, wherein said displaying control means outputs said decoded character information such that a horizontal size of said sections is controlled in accordance with said size mode signal due to said modifying said horizontal size data in accordance with said size mode signal by said modifying means.

3. A television receiver for reproducing a video image from a video signal to be reproduced to have a first frame with a first aspect ratio, said television receiver having display means having a picture plane having a second aspect ratio different from said first aspect ratio, said video signal including a picture signal and a coded character signal to be reproduced within said first frame, said coded character signal including character information and positional information of said character information, comprising:

(a) first converting means for converting said picture signal into a second picture signal to be reproduced to have a second frame with said first aspect ratio on said picture plane in accordance with a size mode signal;

(b) character signal processing means including:
decoding means for extracting said coded character signal and for decoding said coded character signal to obtain said character information and said positional information;
synchronizing signal detection means for detecting vertical and horizontal synchronizing signals from said video signal;
clock signal generation means for generating a clock signal in response to the vertical or the horizontal synchronizing signal;
storing means for storing vertical and horizontal position data of a predetermined region having a plurality of sections for displaying said character information and for storing vertical and horizontal size data of said sections; and
modifying means for modifying said stored vertical position data and vertical size data in accordance with said size mode signal; and (c) displaying control means for determining a position of said predetermined region in accordance with said modified vertical position data and for determining which section of said predetermined region said character information is displayed on in accordance with said positional information and for outputting said decoded character information at a timing determined in accordance with said determined section with reference to said horizontal synchronizing signal, said modified vertical size data, and said clock signal, said display means displaying an image from said second picture signal and a character image from said outputted character information from said display control means with said character image superimposed on said displayed image, wherein said displaying control means outputs said decoded character information such that a vertical size of said sections is controlled in accordance with said size mode signal due to said modifying said vertical size data in accordance with said size mode signal by said modifying means.

4. A television receiver for reproducing a video image from a video signal to be reproduced to have a first frame with a first aspect ratio, said television receiver having display means having a picture plane having a second aspect ratio different from said first aspect ratio, said video signal including a picture signal and a coded character signal to be reproduced within said first frame, said coded character signal including character information and positional information of said character information, comprising:

(a) first converting means for converting said picture signal into a second picture signal to be reproduced to have a second frame with said first aspect ratio on said picture plane in accordance with a size mode signal;

(b) character signal processing means including:

decoding means for extracting said coded character signal and for decoding said coded character signal to obtain decoded character information and decoded positional information;

synchronizing signal detection means for detecting vertical and horizontal synchronizing signals from said video signal;

clock signal generation means for generating a first clock signal in response to the vertical or the horizontal synchronizing signal;

storing means for storing vertical and horizontal position data of a predetermined region having a plurality of sections for displaying said character information and for storing vertical and horizontal size data of said sections and control means for controlling a frequency of said first clock signal, for modifying said stored horizontal position data in accordance with said size mode signal, for producing a second clock signal by frequency-multiplying said horizontal synchronizing signal, and for modifying said stored vertical position data in accordance with said size mode signal; and (c) displaying control means for determining a position of said predetermined region in accordance with said modified position data and for determining which section said character information is displayed on in accordance with said positional information and for outputting said decoded character information at a timing determined in accordance with said determined section with reference to said horizontal synchronizing signal, said size data, said first clock signal, and said second clock signal, said display means displaying an image from said second picture signal and a character image from said outputted character information from said display control means with said character image superimposed on said displayed image, wherein said displaying control means outputs said decoded character information such that a horizontal size of said sections is controlled in accordance with said size mode signal due to said controlling of said frequency of said first clock signal by said control means in accordance with said size mode signal and a vertical size of said sections is controlled in accordance with said size mode signal due to said frequency-multiplying of said horizontal synchronizing signal in accordance with said size mode signal by said control means to produce said second clock signal.

5. A television receiver for reproducing a video image from a video signal to be reproduced to have a first frame with a first aspect ratio, said television receiver having display means having a picture plane having a second aspect ratio different from said first aspect ratio, said video signal including a picture signal and a coded character signal to be reproduced within said first frame, said coded character signal including character information and positional information of said character information, comprising:

(a) first converting means for converting said picture signal into a second picture signal to be reproduced to have a second frame with said first aspect ratio on said picture plane in accordance with a size mode signal;

(b) character signal processing means including:

decoding means for extracting said coded character signal and for decoding said coded character signal to obtain decoded character information and decoded positional information;

synchronizing signal detection means for detecting vertical and horizontal synchronizing signals from said video signal;

clock signal generation means for generating a clock signal in response to the vertical or the horizontal synchronizing signal;

storing means for storing vertical and horizontal position data of a predetermined region having a plurality of sections for displaying said character information and for storing vertical and horizontal size data of said sections; and control means for controlling a frequency of said clock signal and for modifying said stored horizontal position data in accordance with said size mode signal; and (c) displaying control means for determining a position of said predetermined region in accordance with said modified horizontal position data and for determining which section of said predetermined region said character information is displayed on in accordance with said positional information and for outputting said decoded character information at a timing determined in accordance with said determined section with reference to said horizontal synchronizing signal, said size data, and said clock signal, said display means displaying an image from said second picture signal and a character image from said outputted character information from said display control means with said character image superimposed on said displayed image, wherein said displaying control means outputs said decoded character information such that a horizontal size of said sections is controlled in accordance with said size mode signal due to said controlling of said frequency of said clock signal in accordance with said size mode signal by said control means.

6. A television receiver for reproducing a video image from a video signal to be reproduced to have a first frame with a first aspect ratio, said television receiver having display means having a picture plane having a second aspect ratio different from said first aspect ratio, said video signal including a picture signal and a coded character signal to be reproduced within said first frame, said coded character signal including character information and positional information of said character information, comprising:

(a) first converting means for converting said picture signal into a second picture signal to be reproduced to have a second frame with said first aspect ratio on said picture plane in accordance with a size mode signal;

(b) character signal processing means including:

decoding means for extracting said coded character signal and for decoding said coded character signal to obtain decoded character information and decoded positional information;

synchronizing signal detection means for detecting vertical and horizontal synchronizing signals from said video signal;

clock signal generation means for generating a first clock signal in response to the vertical or the horizontal synchronizing signal;

storing means for storing vertical and horizontal position data of a predetermined region having a plurality of sections for displaying said character information, and for storing vertical and horizontal size data of said sections; and control means for producing a second clock signal by frequency-multiplying said horizontal synchronizing signal and for modifying said stored vertical position data in accordance with said size mode signal; and (c) displaying control means for determining a position of said predetermined region in accordance with said modified position data and for determining which section said character information is displayed on in accordance with said positional information and for outputting said decoded character information at a timing determined in accordance with said determined section with reference to said second clock signal, said size data, and said first clock signal, said display means displaying an image from said second picture signal and a character image from said outputted character information from said display control means with said character image superimposed on said displayed image, wherein said displaying control means outputs said decoded character information such that a vertical size of said sections is controlled in accordance with said size mode signal due to said frequency-multiplying of said horizontal synchronizing signal in accordance with said size mode signal by said control means to produce said second clock signal.

7. A television receiver as claimed in claim 1, wherein said picture plane has a first vertical length and a first horizontal length and said second frame has a second vertical length and a second horizontal length, said first vertical length substantially agreeing with said second vertical length.

8. A television receiver as claimed in claim 1, wherein said picture plane has a first vertical length and a first horizontal length and said second frame has a second vertical length and a second horizontal length, said first horizontal length substantially agreeing with said second horizontal length.

9. A television receiver a claimed in claim 1, wherein said first aspect ratio is 4:3 and said second aspect ratio is 16:9.

10. A television receiver as claimed in claim 2, wherein said picture plane has a first vertical length and a first horizontal length and said second frame has a second vertical length and a second horizontal length, said first vertical length substantially agreeing with said second vertical length.

11. A television receiver as claimed in claim 2, wherein said first aspect ratio is 4:3 and said second aspect ratio is 16:9.

12. A television receiver as claimed in claim 3, wherein said picture plane has a first vertical length and a first horizontal length and said second frame has a second vertical length and a second horizontal length, said first horizontal length substantially agreeing with said second horizontal length.

13. A television receiver as claimed in claim 3, wherein said first aspect ratio is 4:3 and said second aspect ratio is 16:9.

14. A television receiver as claimed in claim 4, wherein said picture plane has a first vertical length and a first horizontal length and said second frame has a second vertical length and a second horizontal length, said first vertical length substantially agreeing with said second vertical length.

15. A television receiver as claimed in claim 4, wherein said picture plane has a first vertical length and a first horizontal length and said second frame has a second vertical length and a second horizontal length, said first horizontal length substantially agreeing with said second horizontal length.

16. A television receiver as claimed in claim 4, wherein said first aspect ratio is 4:3 and said second aspect ratio is 16:9.

17. A television receiver as claimed in claim 5, wherein said picture plane has a first vertical length and a first horizontal length and said second frame has a second vertical length and a second horizontal length, said first vertical length substantially agreeing with said second vertical length.

18. A television receiver as claimed in claim 5, wherein said first aspect ratio is 4:3 and said second aspect ratio is 16:9.

19. A television receiver as claimed in claim 6, wherein said picture plane has a first vertical length and a first horizontal length and said second frame has a second vertical length and a second horizontal length, said first horizontal length substantially agreeing with said second horizontal length.

20. A television receiver as claimed in claim 6, wherein said first aspect ratio is 4:3 and said second aspect ratio is 16:9.

* * * * *